UNITED STATES PATENT OFFICE.

LAWRENCE ADDICKS, OF PERTH AMBOY, AND CLARENCE L. BROWER, OF CHROME, NEW JERSEY.

METALLURGY OF COPPER.

1,148,814.  Specification of Letters Patent.  Patented Aug. 3, 1915.

No Drawing.   Application filed August 9, 1913.   Serial No. 783,854.

*To all whom it may concern:*

Be it known that we, LAWRENCE ADDICKS, residing at Perth Amboy, in the county of Middlesex and State of New Jersey, and CLARENCE L. BROWER, residing at Chrome, in said county and State, both citizens of the United States, have jointly invented certain new and useful Improvements in the Metallurgy of Copper, of which the following is a specification.

This invention relates to the metallurgy of copper, that is to say, to the refining of copper and to the melting of copper.

Copper refining has heretofore commonly been practised in a reverberatory furnace having silicious walls or linings, the side walls and roof being commonly built of silica bricks and the hearth of silica brick or of sand with usually a cooling vault beneath. The metallic bases constituting impurities in the copper have, when heated, a strong affinity for silica, which is furnished by the sand or other silicious hearth and to a certain extent by the walls and roof of the furnace. The oxygen which is introduced into the copper by blowing or flapping combines with the copper as cuprous oxid, which is dissolved in the copper to the saturation point, beyond which point oxidation causes direct slagging of copper. Cuprous oxid displaces most of the impurities present by forming oxids which float and are removed by skimming. After skimming, the cuprous oxid dissolved in the copper is reduced by poling, whereupon the purified copper, being suitably protected from oxidation, may be tapped off and cast into ingots or otherwise.

In the ordinary reverberatory the silica furnished by the furnace forms with the cuprous oxid a silicate slag which has to be removed for retreatment in a blast furnace, which is an expensive process. The erosion of the furnace causes expense for repairs, and should the charge contain impurities which when oxidized have a strong affinity for silica, the furnace is endangered, the failure of the furnace bottom being liable to occur, whereby the charge escapes with disastrous results. Various expedients have been resorted to for preventing the failure of the silicious walls or bottom due to the inability to control the extent of erosion or slagging of the silicious material.

In our application Serial No. 769,176, filed May 22, 1913 we have described a novel construction of furnace wherein, instead of an acid or silicious lining, the lining is basic or neutral. The furnace hearth is built of magnesite bricks, while the side walls and the roof are built of chrome bricks, although for some operations the walls and roof may be of other materials. The use of this furnace results in certain improvements in the metallurgy of copper, notably in the melting of relatively pure copper which is performed with the minimum of oxidation and with the practical suppression of slag. The melting or refining of electrolytic cathodes or other relatively pure forms of copper is performed by our invention by a simple melting and poling, the charge when molten being covered with crushed coke or similar protecting material, and the furnace being heated in such manner as to avoid the carrying of ash into the charge. In this process not only is basic or neutral material used for lining all parts of the furnace which come in contact with the charge, but such material is also used for luting the furnace doors. By these means the contamination of the copper with slag which has heretofore been inevitable, is practically avoided, the relatively small proportion of cuprous oxid formed during the melting being eliminated by poling.

In copper refining, three classes of material are ordinarily dealt with, namely (1) foul, such as secondary metallurgical products from junk smelting, cement copper, alloy turnings and the like; (2) normal, such as blister copper from converter plants; and (3) pure, such as cathode copper.

(1) Foul material. Where much lead is present the silicious furnace fails, and heretofore this work has either been done in a basic furnace on a small scale where problems of construction do not seriously enter, or the material has been diluted by the addition of large quantities of relatively pure copper to bring it above the danger zone. The basic furnace enables this class to be treated by itself, thereby avoiding introducing impurities into the large quantity of diluent and correspondingly increasing the degree of their elimination, as it is always possible to remove a greater percentage of an element by scorification when that element is present in quantity. Also the impurities are concentrated in a much smaller bulk of slag, thereby facilitating their recovery, if of value. Finally the charge can be worked thoroughly as there is no fear of resulting danger to the furnace.

(2) When ordinary blister copper is treated in a silicious furnace, slag to about four per cent. of the weight of the charge is formed, while the quantity necessary to carry off the impurities is far less than this figure. Some silica is desirable to form the necessary slag, but sufficient is present in the bullion itself and in the ash from the charcoal or coke, poles, etc., used in the preceding charge. Our furnace thus avoids introducing a needless proportion of silica and hence diminishes the production of slag.

(3) Pure material, such as cathodes, require with the basic furnace but a simple melting, whereas under silicious practice the same cycle of operations with production of about three per cent. of slag is gone through with as in the case of blister copper. Our basic furnace makes possible the practical suppression of slag. In actual practice the slag made in ordinary cyclic operation need not exceed one-half per cent. As soon as the charge is melted it should be covered with a layer of crushed coke or other material to protect it from oxidation. This material should be of low ash content to avoid consequent formation of slag. The firing should be so practised as to avoid carrying over ash into the charge, either by using coal in a large fire box so as to disengage practically no ash, or by using gas, oil, or other ash-free fuel. The furnace doors are to be luted by the use of basic material. Poling is necessarily resorted to for the reduction of such cuprous oxid as is unavoidably formed during the melting. The small amount of slag formed can be left in the furnace, or charged back, during several successive melts. This basic furnace also renders practicable the continuous operation of the reverberatory by repeatedly charging in the cathodes and tapping off the molten copper.

It is possible that other basic materials than magnesite brick may be used as the furnace hearth, and that other basic or neutral materials than chrome brick may be used for the side walls and roof; but these are practicable refractory materials for the purpose of our invention and have given satisfactory results.

In any refining of copper, the molten charge after skimming should be covered with a carbonaceous protecting layer to avoid further oxidation, and the precautions above referred to against the introduction of slag from the ash, and of luting by basic material, should be resorted to.

The process herein set forth is in part described in our aforesaid application No. 769,176 wherein the furnace is claimed. This process, however, is not the process necessarily performed in the use of said construction of furnace, nor is the process dependent upon the construction of furnace which is the subject of the aforesaid application.

We claim as our invention:—

1. The refining of nearly pure copper by simple melting under non-reducing conditions and in the presence of only sufficient acid material to slag off the small proportion of impurities contained while minimizing the formation of slag by avoiding contact with acid lining material, and subsequently poling out the small proportion of cuprous oxid incidentally formed.

2. The refining of nearly pure copper by simple melting under mildly oxidizing conditions and in the presence of only sufficient acid material to slag off the small proportion of impurities contained while minimizing the formation of slag by avoiding contact with acid lining material, and subsequently poling out the small proportion of cuprous oxid incidentally formed.

3. The refining of nearly pure copper by simple melting under mildly oxidizing conditions and in the presence of only sufficient acid material to slag off the small proportion of impurities contained while minimizing the formation of slag by avoiding contact with acid lining material, firing in such manner as to prevent ash coming in contact with the charge, and subsequently poling out the small proportion of cuprous oxid incidentally formed.

4. The refining of nearly pure copper by simple melting under mildly oxidizing conditions and in the presence of only sufficient acid material to slag off the small proportion of impurities contained while minimizing the formation of slag by avoiding contact with acid material, covering the molten charge with a protecting layer of carbonaceous material of minimum ash content, firing in such manner as to prevent ash coming in contact with the charge, and subsequently poling out the small proportion of cuprous oxid incidentally formed.

5. The refining of nearly pure copper by simple melting under non-reducing conditions and in the presence of only sufficient acid material to slag off the small proportion of impurities contained while limiting the formation of slag to within one per cent. of the charge by avoiding contact with acid lining material, and subsequently poling out the small proportion of cuprous oxid incidentally formed.

6. The process of refining nearly pure copper such as electrolytic cathodes which comprises melting such copper on a non-acid hearth under mildly oxidizing conditions and in contact with substantially only enough acid material to slag off the contained impurities, while limiting the oxidation of the copper to that incidental to melting and poling to reduce cuprous oxid.

In witness whereof, we have hereunto signed our names in the presence of two subscribing witnesses.

LAWRENCE ADDICKS.
CLARENCE L. BROWER.

Witnesses:
EDW. J. BULFIN,
JACOB ROTH.